United States Patent [19]
Ozeki et al.

[11] Patent Number: 5,392,556
[45] Date of Patent: Feb. 28, 1995

[54] REEL LEG FIXING DEVICE FOR FISHING ROD

[75] Inventors: Takafumi Ozeki; Masaru Akiba; Shuichi Kimura; Nobuo Nodera; Tomoyoshi Tsurufuji, all of Tokyo, Japan

[73] Assignee: Daiwa Seiko, Inc., Tokyo, Japan

[21] Appl. No.: 42,264

[22] Filed: Apr. 2, 1993

[30] Foreign Application Priority Data

| Apr. 3, 1992 | [JP] | Japan | 4-109164 |
| Feb. 2, 1993 | [JP] | Japan | 5-036205 |
| Feb. 2, 1993 | [JP] | Japan | 5-036206 |
| Feb. 12, 1993 | [JP] | Japan | 5-009586 |
| Feb. 12, 1993 | [JP] | Japan | 5-047252 |
| Feb. 16, 1993 | [JP] | Japan | 5-010354 |

[51] Int. Cl.$^6$ ............................................. A01K 87/06
[52] U.S. Cl. .................................................... 43/22
[58] Field of Search ........................................ 43/22, 23

[56] References Cited

U.S. PATENT DOCUMENTS

| 434,793 | 8/1890 | Landman | 43/22 |
| 831,764 | 9/1906 | Bartlett | 43/22 |
| 1,883,041 | 10/1932 | Somers | 43/22 |
| 2,076,629 | 4/1937 | Edwards | 43/22 |
| 2,145,612 | 1/1939 | Scogland | 43/22 |
| 2,194,029 | 3/1940 | Morehouse | 43/22 |
| 4,802,299 | 2/1989 | Ohmura | 43/22 |
| 4,918,852 | 4/1990 | Yamato | 43/22 |
| 5,088,225 | 2/1992 | Yamamoto | 43/22 |

FOREIGN PATENT DOCUMENTS

| 1291563 | 3/1962 | France . | |
| 50-121091 | 9/1975 | Japan . | |
| 51-20989 | 2/1976 | Japan . | |
| 53-86385 | 7/1978 | Japan . | |
| 63-23972 | 2/1988 | Japan . | |
| 376462 | 7/1991 | Japan . | |
| 4-19173 | 2/1992 | Japan . | |
| 0839582 | 6/1960 | United Kingdom | 43/22 |

Primary Examiner—P. Austin Bradley
Assistant Examiner—James Miner
Attorney, Agent, or Firm—Longacre & White

[57] ABSTRACT

A reel leg fixing device is made up of a tubular main body 3 provided with a first reel leg receive portion 2 and fittable loosely onto a rod 1, a support portion 4 disposed on one side portion of the tubular main body 3 and extended in the longitudinal direction of the rod 1, a partially cylindrical engaging receive portion 6' fitted loosely onto the rod 1, and a fastening tubular member 8' fitted loosely onto the rod 1, provided with a second reel leg receive portion 7 and fittable with the engaging receive portion 6'. The fastening tubular member 8' is designed to fasten the engaging receive portion 6' onto the rod 1 to adjust the fixing position of the reel leg and to fix the reel leg to the rod positively.

11 Claims, 7 Drawing Sheets

REEL LEG FIXING DEVICE FOR FISHING ROD

BACKGROUND OF THE INVENTION

The present invention relates to an improvement for a reel leg fixing device for mounting and fixing a reel leg onto a fishing rod (the term "rod", in this specification, is intended to express a rod itself or a grip portion provided on the outside of the rod).

A conventional reel leg fixing device adapted to fix a reel leg onto a rod is designed so that the fixing position of the reel leg relative to the fishing rod can be adjusted.

Japanese Patent Publication No. 53-86385 discloses a reel leg fixing device or reel stand in which slits are formed respectively in end portions of a first pipe-shaped member and the slit portions are fastened and fixed to a rod pipe by means of a fixing hood side end portion of a second pipe-shaped member and a fastening nut, in order to adjust the position of the fixing device relative to the rod.

Japanese utility Model Publication No. 63-23972 discloses a reel leg fixing device in which a pair of ring hoods each having a reel leg receive portion are fitted opposingly to each other onto the outer periphery of a flexible pipe fitted on a rod, and a reel leg is then fixed between the pair of ring hoods.

Japanese utility Model Publication No. 51-20989 discloses a reel leg fixing device in which threaded portions each having slits are provided respectively in end portions of a pipe fitted onto a rod and the respective threaded portions are then fastened and fixed by use of nut members to thereby position a reel leg in place.

Japanese Patent Publication No. 50-121091 discloses a reel leg fixing device in which an elongated hole is formed in a pipe-shaped member, an inner surface portion corresponding to a fixing hood is formed in one end of the elongated hole, and a threaded portion is formed in the other end thereof, whereby a reel leg can be fastened by use of a nut-shaped ring in engagement with the threaded portion.

Japanese utility Model Publication No. 4-19173 discloses a reel leg fixing device in which a pair of ring members are fitted onto a rod and the ring members are moved toward each other so that a reel leg is tightly inserted into the ring members, to thereby fix the reel leg to the rod.

In addition to the above-mentioned reel leg fixing devices of a type that the fixing position of the reel leg is adjustable, there is conventionally known a reel leg fixing device of a type that the fixing position of a reel leg is fixed. Japanese utility Model Publication No. 3-76462 discloses a reel leg fixing device of this type, in which a threadedly engaging portion is formed in the front part of a reel leg placing portion fixedly provided on the outer periphery of a rod, and a nut member is threadedly engaged with the threadedly engaging portion to thereby fix a reel leg.

In the conventional reel leg fixing devices disclosed, for instance, in the '385 and '989 publications, in order to fix the reel leg to the rod, two or more nut members must be tightened individually, which makes it troublesome to mount the reel leg on the rod and also increases the entire weight thereof. Also, in the device disclosed, for instance, in the '972 publication, since the pair of ring hoods fix the reel leg individually, the holding force of the reel leg is weak and thus there is a possibility that a reel can be slip off from the rod.

In the device disclosed, for instance, in the '462 publication, the reel leg is fixed to the rod by tightening a single ring (or nut) but, because no split portion is formed in the threaded portion in the one end portion of the pipe-shaped member to be threadedly engaged with the ring, the fixing and holding of the pipe-shaped member with respect to the rod is not sufficient and there is a possibility that the fixing and holding of the pipe-shaped member may be loosened to thereby cause the reel leg to slip off from the rod pipe.

Further, in the conventional device of the type utilizing the threading engagement, if the nut member to be threadedly engaged is tightened by main force, then the pipe-shaped member or reel leg can be fixed strongly to the rod but, in this case, when removing the reel, it is often found difficult to remove it because the reel leg is fastened to the rod too tightly. Also, the threaded portions can be damaged and, further, the rod pipe can be deformed. In particular, the reel leg fixing area also serves as a grip portion and thus the surface of the grip portion of the rod is often covered with cork or other elastic member. For this reason, the grip portion area is easy to deform and this deformation in turn is apt to cause other components of the device to be forcibly deformed.

Furthermore, in the conventional reel leg fixing devices, when the reel is not fixed, the respective annular members (which terms are used here in a broad sense, that is, including pipe-shaped members as well) are free to move in the longitudinal direction of the rod. Therefore, in order to be able to restrict such free movements within a given range of length, ring members must be respectively fixed on the ends of a movement allowable range. However, mounting of other additional parts increases the weight and cost of the fishing rod. Also, since the respective annular members are still free to move within the allowable range, the reel leg fixing operation cannot be executed conveniently to a desired degree.

Still further, in the conventional reel leg fixing devices, to fasten the reel leg to a rod, the reel leg is fastened while the nut is operated in threaded engagement. However, this is sometimes troublesome when the reel leg must be fixed quickly.

Yet further, in the conventional reel leg fixing devices, disclosed, for instance, in the '091 publication, before the reel leg is fixed or is fastened by the fastening nut or the like, each of the annular members respectively forming part of the fixing devices is loosely fitted with the rod and is movable in the longitudinal direction of the rod. At the same time, when the reel leg is fixed, each of the annular members is also fixed to the rod by such fixing operation itself or by another nut member or the like. However, after the reel leg is fixed to the fishing rod, when a person is angling while holding the fishing rod by the reel fixed portion thereof, the annular member can be rotated with respect to the fishing rod due to the movements of the angler's hand during the angling operation.

SUMMARY OF THE INVENTION

The present invention was made in order to solve the problems found in the conventional reel leg fixing device.

It is an object of the invention to provide a fishing rod reel leg fixing device which is able to adjust the fixing position of a reel leg with ease and is also able to hold and fix the reel leg to a rod positively.

It is another object of the invention to provide a reel leg fixing device which is able to fix a reel leg with a reasonable force and thus to prevent other components from being deformed forcibly.

It is still another object of the invention to provide a reel leg fixing device which is able to freely set the fixing position of a reel leg and also, when the reel leg is not fixed, an annular member forming a component of the device can be held at an arbitrary position.

It is a further object of the invention to provide a reel leg fixing device which is able to fasten a reel leg quickly when the reel leg is to be fixed.

It is a still further object of the invention to provide a reel leg fixing device in which an annular member forming a component of the device is free to move in the longitudinal direction of a fishing rod before a reel leg is fixed or is fastened by a fastening tubular member and the annular member is prevented from rotating with respect to the rod while the fishing rod is in use after the reel leg is mounted and fixed to the rod.

In attaining the above objects according to a first aspect of the invention, there is provided a reel leg fixing device for mounting and fixing a reel leg to a fishing rod, which comprises: a tubular main body provided with a first reel leg receive portion and loosely fittable onto a rod; a support portion disposed on one side portion of the tubular main body and extending in the longitudinal direction of the rod; an engaging receive portion, cylindrically shaped in part, formed in the leading end portion of the support portion and loosely fitted onto the rod; and, a fastening tubular member loosely fitted on the rod, the fastening tubular member provided with a second reel leg receive portion and tightly fittable onto the engaging receive portion so that the engaging receive portion is fastened to the rod.

Threaded portions are formed in the engaging receive portion and fastening tubular member respectively to thereby threadedly engaging them with each other, or a flexible member is loaded into the fastening tubular member to thereby fit or engage the fastening tubular member with the engaging receive portion.

Further, the end portion of the tubular main body disposed on the opposite side to the reel leg receive portion thereof and also on the opposite side to the support portion is cut, and further the support portion is formed in such a manner that the side portion area of the rod situated in an intermediate angular position between the reel leg receive portion and the cut portion can be exposed.

While the partially cylindrical-shaped engaging receive portion is connected to the one end portion of the tubular main body through the support portion, if one end of the reel leg is inserted into the first reel leg receive portion with the other end thereof inserted into the second reel leg receive portion and the fastening tubular member is moved forwardly and is fastened to and fitted with the engaging receive portion, then the reel leg is pushed and fixed onto the rod and simultaneously the engaging receive portion is positively pushed and fixed to the rod due to the action of the partial cylinder with a split portion, so that the reel leg can be held and fixed positively.

When the flexible member is provided on the inside of the fastening tubular member, the fastening tubular member is moved linearly without any threadedly engaging operation up to a predetermined amount with respect to the engaging receive portion and thus the reel leg fixing operation can be executed more quickly, accordingly.

If the end portion of the tubular main body disposed on the opposite side to the reel leg receive portion thereof and also on the opposite side to the support portion is cut, and also if the support portion is provided on and extended from the tubular main body in such a manner that the side portion area of the rod is exposed, then the rod can be gripped directly by fisherman's hand without these members being touched by fingers. This can stabilize the hand gripping the rod and also can prevent the reel leg fixing device from being loosened.

According to a second aspect of the invention, there is provided a reel leg fixing device including a main body and a fastening tubular member for threadedly fastening the main body, characterized by a stopper which is used to stop the threaded advancing movement of the fastening tubular member relative to the main body at a predetermined position.

Due to the provision of the stopper, the fastening tubular member can be prevented from threadedly advancing to the main body excessively.

According to a third aspect of the invention, there is provided a reel leg fixing device capable of freely setting the fixing position of a reel leg onto a rod by use of an annular member, in which the annular member is formed of such an elastic material that the diameter of the annular member can be increased to or more than the outside diameter of a rod and, the annular member can be secured to the rod by the elastic force thereof in a state where the reel leg is not fixed.

Since the annular member is formed of the elastic material such that the diameter of the annular member can be expanded to and more than the outside diameter of the rod, if the diameter of the annular member is enlarged, then the reel leg fixing device can be slid to a desired position and, if it is released, then the annular member is contracted due to the elastic force thereof and thus is naturally engaged with the rod, so that the annular member can be retained at an arbitrary position.

According to a fourth aspect of the invention, there is provided a reel leg fixing device in which at least one of hoods each having a reel leg receive portion for receiving a reel leg is a moving hood and, at a position of the reel leg to be received by the moving hood in the longitudinal direction of a rod, there is provided in the rod or in a member fitted onto the rod a steeply inclined portion which is increased in height as it advances in a direction where the moving hood moves to fasten the reel leg.

When the reel leg is fastened by moving the moving hood with respect to the reel leg, a steeply inclined portion formed in a rod or a similar member at a position thereof which corresponds to the reel leg functions so that the moving hood is brought into engagement with the steeply inclined portion to thereby fasten the reel leg quickly.

According to a fifth aspect of the invention, there is provided a reel leg fixing device which includes an annular member loosely fitted with a fishing rod and free to move in the longitudinal direction of the rod and which is adapted to mount a reel leg to the annular member and to push and hold the annular member against the rod, characterized in that slightly projected and recessed portions are formed in the inner periphery of the annular member.

Also, there is provided a reel leg fixing device in which an annular member having an elastically deformable transverse section, fitted loosely with a fishing rod and free to move in the longitudinal direction of the rod is threadedly rotated to thereby fasten and fix a reel leg to the rod.

In the former fixing device in which the slightly projected and recessed portions are formed in the inner periphery of the annular member, if the annular member is pushed and held against the fishing rod, then the slightly projected and recessed portions provide resistance to the annular member when the annular member is rotated with respect to the rod, so that the annular member can be prevented against such rotation.

In the latter fixing device in which the transverse section of the annular member is elastically deformable, if a reel leg is inserted between the annular member and the fishing rod and is then fastened by threadedly rotating the annular member, then the annular member is deformed along the rod and reel leg. Thus, the section of the annular member is changed into an ellipsoidal shape or the like differing from a true circle and, the annular member is in tight contact with the rod or the like, so that the annular member can be prevented from rotating with respect to the rod.

DETAILED DESCRIPTION OF THE INVENTION

Description will hereinbelow be given in more detail of the invention by way of the embodiments thereof respectively shown in the accompanying drawings.

At first, a reel leg fixing device according to a first aspect of the invention will be described with reference to FIGS. 1 to 9. The reel leg fixing device for mounting and fixing a reel leg A onto a rod 1 includes a tubular main body 3. The tubular main body 3 is loosely fitted onto the rear portion the rod 1 and includes a first reel leg receive portion 2 in the lower portion thereof. In the upper portion of the tubular main body 3 that is disposed on the opposite side to the first reel leg receive portion 2, there is provided a support portion 4 in such a manner that it extends along the longitudinal direction of the rod 1. In the leading end portion of the support portion 4, there is provided a semi-cylindrical engaging receive portion 6 which includes a split portion 14 in the lower portion thereof. And, the engaging receive portion 6 also includes on the surface thereof a threaded portion 5 having threaded grooves.

Figure 1:
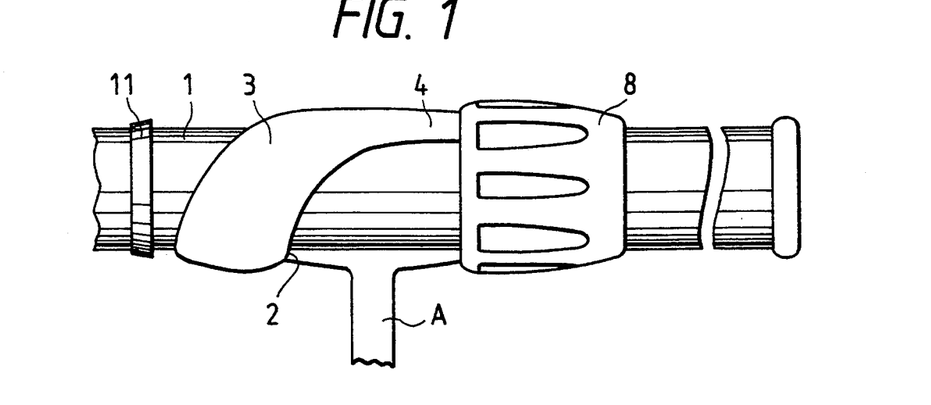
FIG. 1 is a side view of a state in which a reel is fixed to a rod by an embodiment of a reel leg fixing device according to a first aspect of the invention.
Figure 3:
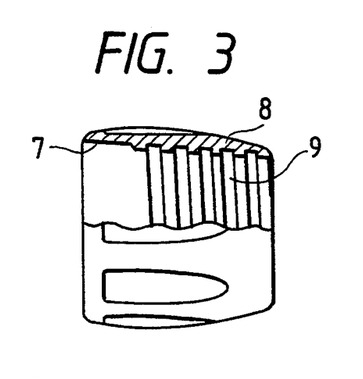
FIG. 3 is a partially longitudinal section view of another component of the reel leg fixing device shown in FIG. 1.
Figure 4:
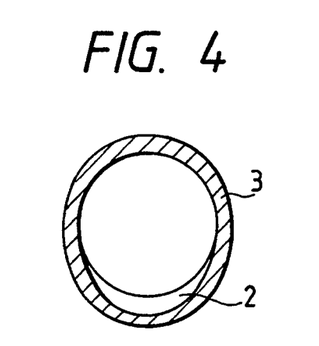
FIG. 4 is a transverse section view taken along the arrow line A—A shown in FIG. 2.
Figure 5:
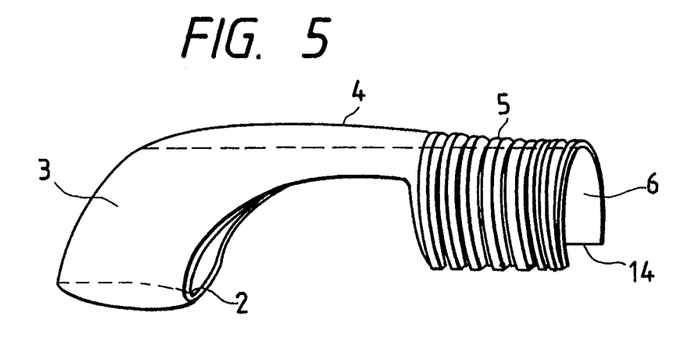
FIG. 5 is a perspective view of the component shown in FIG. 2.

Further, there is provided a fastening tubular member 8 which includes a second reel leg receive portion 7 in the inner periphery of the front end portion thereof and a threaded portion 9 on the surface thereof, such that the fastening tubular member 8 is threadedly engageable with the threaded portion 5 of the engaging receive portion 5.

In this structure, if one end of a reel leg A is inserted into the first reel leg receive portion 2 of the tubular main body 3, the other end of the reel leg A is inserted into the second reel leg receive portion 7 of the fastening tubular member 8, and the fastening tubular member 8 is threadedly engaged with the threaded portion 5 of the engaging receive portion 6 and is moved forwardly, then the reel leg A can be fastened to and passed against the rod 1 and, simultaneously, the tubular main body 3, engaging receive portion 6 and fastening tubular member 8 are also pressure fastened to the rod 1, respectively. In this pressure fastening operation, simply by rotating only the fastening tubular member 8, the tubular main body 3 can also be pulled and thus the reel leg A can be fastened with pressure. That is, the pressure fastening operation is very simple and convenient.

Figure 2:
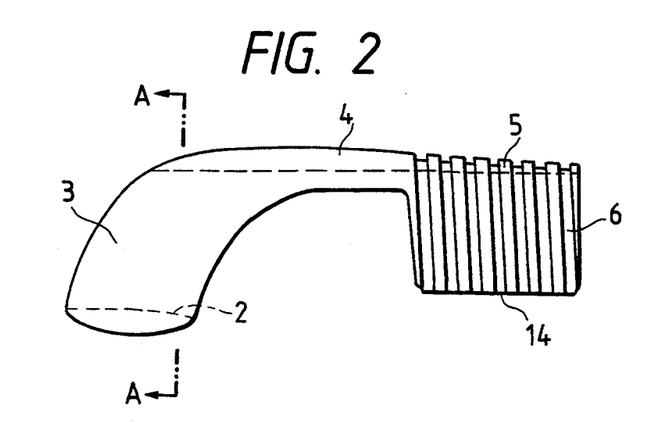
FIG. 2 is a side view of a component of the reel leg fixing device shown in FIG. 1.

In the above-mentioned first embodiment, the support portion 4 is disposed in the upper portion of the tubular main body 3. However, alternatively, the support portion 4 may be disposed in the side portion or lower portion of the tubular main body 3. The reason why the support portion 4 is disposed only in the upper portion of the tubular main body 3 and is bulged out upwardly in the first embodiment is that, when the support portion 4 is gripped by hand, the bulged portion can offer a better gripping feeling and also that, because the side portion area of the rod 1 is exposed, the fingertips of the holding hand may lightly touch the tubular main body 3 and support portion 4. This stabilizes the holding hand and at the same time prevents the reel leg fixing device from being naturally loosened during the angling operation. Also, the reel leg fixing device may be preferably formed of a fiber reinforced synthetic resin or metal. Reference character 11 designates a stopper which is designed to prevent the tubular main body 3 from slipping off forwardly when the reel is removed.

Also, in the first embodiment, the fastening tubular member 8 is constructed in such a manner that the reel leg receive portion 7 and threaded portion 9 thereof are formed integrally with other. However, the reel leg receive portion may be formed separately from the threaded portion and then they may be engaged with each other in such a manner that they are mutually rotatable to each other.

Figure 7:
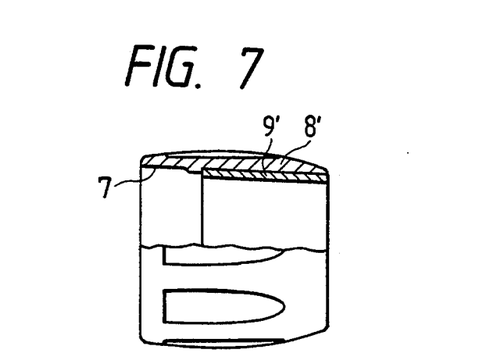
FIG. 7 is a partially longitudinal section view of a component of the reel leg fixing device shown in FIG. 6.

Next, description will be given below of a second embodiment of a fishing rod reel leg fixing device according to the invention. In FIG. 7, there is shown a longitudinal section view of a fastening tubular member 8' employed in the second embodiment of the invention. The fastening tubular member 8' includes in the inner peripheral edge of the front portion thereof a second reel leg receive portion 7 similarly to the first embodiment. However, the fastening tubular member 8' is different from the fastening tubular member 8 in the first embodiment in that a flexible member 9' such as rubber or the like is inserted into and fixed to the fastening tubular member 8' in place of the threaded portion 9. Accordingly, by making the flexible member 9' "bite" (i.e. deformably engage) onto the threaded portion 5 of the engaging receive portion 6, the fastening tubular member 8' can be threadedly fitted with the engaging receive portion 6.

Figure 6:
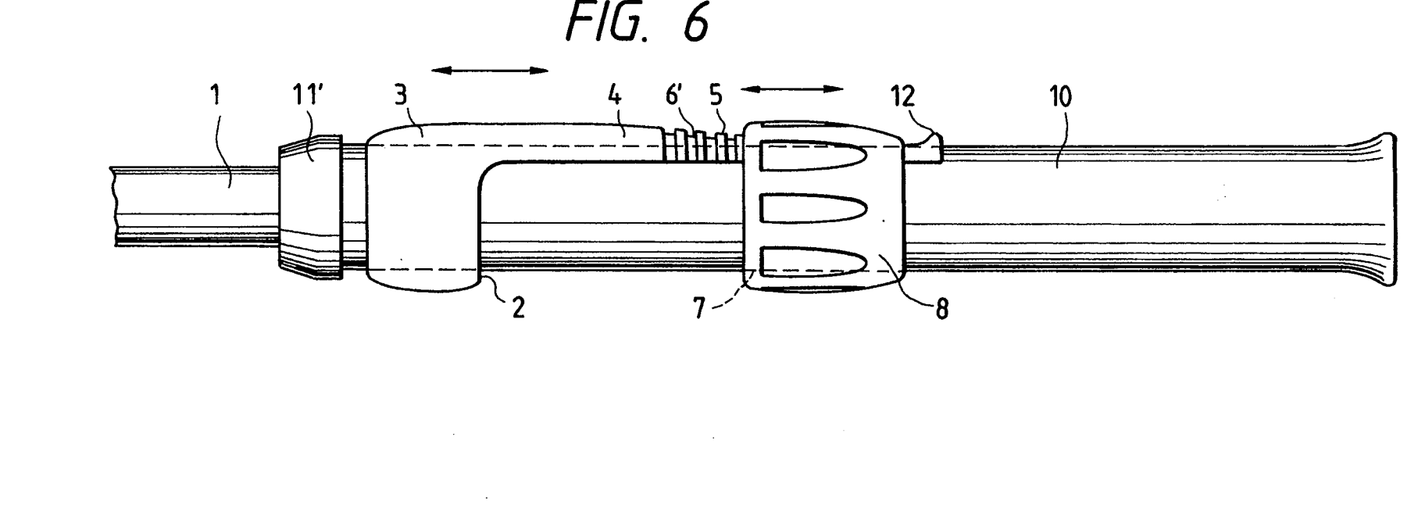
FIG. 6 is a side view of another embodiment of a reel leg fixing device according to the first aspect of the invention.

Now, in FIG. 6, there is shown a state in which the second embodiment of a reel leg fixing device according to the invention is mounted onto a handle portion 10 formed of synthetic resin, cork, or the like. The second embodiment includes a tubular main body 3 and a support portion 4 which is provided on and extended from the tubular main body 3. The support portion 4 includes in the leading end portion thereof an engaging receive portion 6' which is in large part cut and is thus formed in a partially cylindrical shape having a large split portion. This structure is employed in order that the side portion area thereof can be opened widely and thus the handle portion 10 can be gripped by hand directly, similarly to the first embodiment. Also, the reason why the support portion 4 is bulged out upwardly is to stabilize the hand that grips the handle portion 10, similarly to the first embodiment.

If the inner periphery of the fastening tubular member 8' is a threaded portion as in the first embodiment, then the fastening tubular member 8' must be fastened and moved while it is always threadedly rotated with respect to the engaging receive portion 6'. In fact, however, since the fastening tubular member 8' is loaded with the flexible member 9', it can be moved linearly to some degree and after then it can be threadedly rotated while it bites onto and is deformed by the threaded portion 5 of the engaging receive portion 6'. Thus, the fastening operation can be performed more quickly according to the linear movement. And, the engaging receive portion 6' includes in the end portion thereof a projection 12 which is used to prevent the fastening tubular member 8' from slipping off rearwardly when the reel is removed. Reference character 11' stands for a stopper which is provided in the leading end portion of the handle portion 10 to prevent the tubular main body 3 from slipping off forwardly when the reel is removed.

Next, description will be given below of a third embodiment of a fishing rod reel leg fixing device according to the invention with reference to FIGS. 8 and 9. The third embodiment is basically similar to the first embodiment. That is, a support portion 4 is provided on and extended from a side portion of a tubular main body 3', and includes in the front portion thereof an engaging receive portion (which is not shown). The engaging receive portion is formed in a partially cylindrical shape having a split portion in the lower portion thereof, and also includes in the outer periphery thereof a threaded portion having a threaded groove. Therefore, a fastening tubular member 8", which includes in the inner periphery thereof a threaded portion engageable with the threaded portion of the engaging receive portion, in engageable with the engaging receive portion. Of course, as in the second embodiment, the inner periphery of the fastening tubular member 8" may also be loaded with a flexible member.

On the other hand, the tubular main body 3' includes a first reel leg receive portion 2 in the lower side thereof (on the opposite side to the support portion 4), and the fastening tubular member 8" includes a second reel leg receive portion 7 in the inner peripheral edge portion of the front end portion thereof. Thanks to this structure, as shown in FIG. 9, the reel leg A can be fixed onto the rod 1 with pressure.

Figure 8:
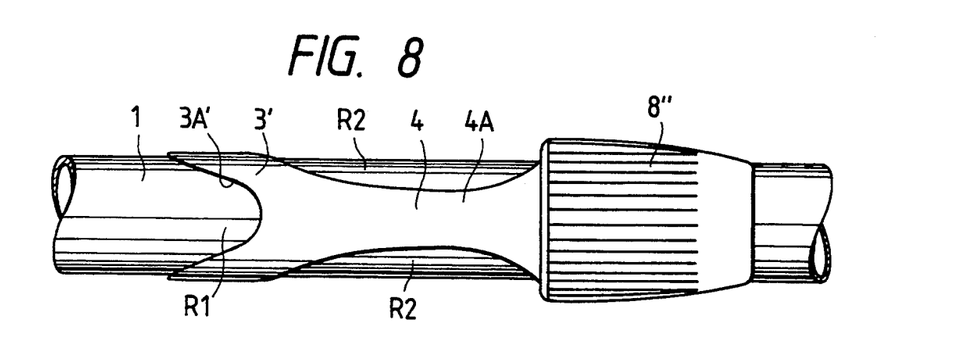
FIG. 8 is a plan view of a further embodiment of a reel leg fixing device according to the first aspect of the invention.
Figure 9:
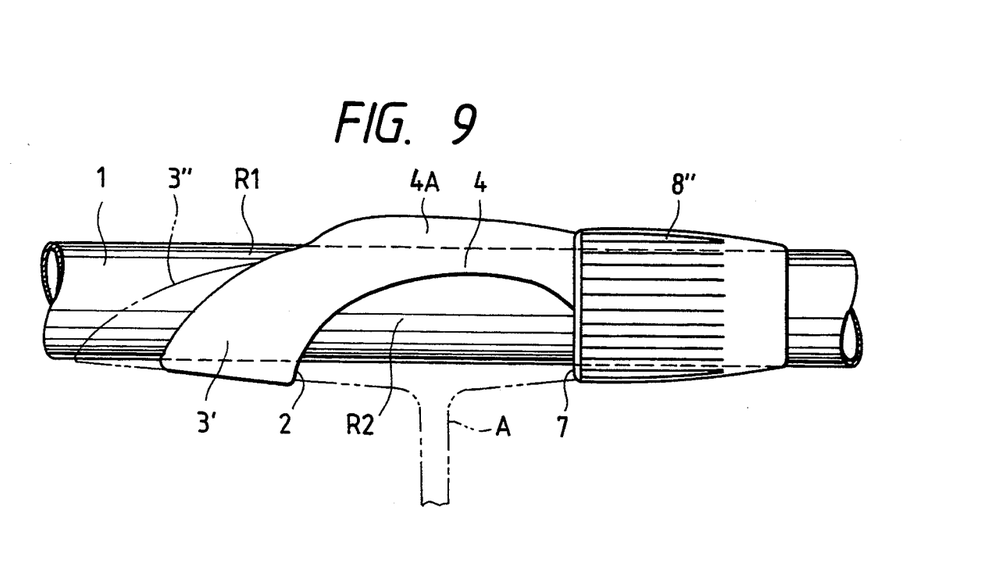
FIG. 9 is a side view of the reel leg fixing device shown in FIG. 8.

In addition to the above structure, according to the third embodiment, as shown in FIG. 8, the end portion of the tubular main body 3' situated on the opposite side to the support portion 4 includes a generally U-shaped groove, thereby establishing provide an edge 3A'. When the portion of the fishing rod where the reel leg fixing device is fixed is held by hand, the edge 3A' allows the thumb of the hand to be placed in the exposed area R1 of the rod 1. Also, since the support portion 4 exists only in the upper portion of the rod 1 as shown in FIG. 9 and the side portion R2 of the fishing rod 1 is exposed, the respective fingers may lightly touch the tubular main body 3' and support portion 4, which can stabilize the holding state, makes it difficult for the reel leg fixing device to be loosened, and makes it easy to feel a bite. Further, because the support portion 4 is bulged out upwardly from the rod 1, the holding can be stabilized. Alternatively, the tubular main body can also be formed in a longer shape as shown by a two-dotted chain line 3" in FIG. 9.

As can be clearly understood from the foregoing description, according to the first aspect of the invention, due to the fact that simply by fitting and fastening only the fastening tubular member to the engaging receiving portion the tubular main body can also be pulled, the fixing position of the reel leg can be adjusted easily and also the number of parts can be decreased and thus the weight of the whole device can be reduced. Also, since the split portion is formed in the engaging receive portion, the pressure fastening of the device to the rod by the fastening tubular member is increased to a sufficient level, so that the reel leg can be held and fixed to the rod positively.

Also, when a flexible member is inserted into the inner periphery of the fastening tubular member, then the reel leg can be fastened without damaging the rod when the reel leg is fixed.

When the leading end portion of the tubular main body disposed on the opposite side to the reel leg receive portion is cut and the support portion is formed to expose the side portion of the rod, then when this area is held by hand, the fingers of the hand may lightly touch the reel leg fixing device. This stabilizes the holding condition, prevents the reel leg fixing device from being loosened, and improves the feeling of a bite.

Also, when the support portion is bulged out upwardly, then the holding condition can be improved.

A reel leg fixing device according to a second aspect of the invention will be described with reference to FIG. 10.

Figure 10A:
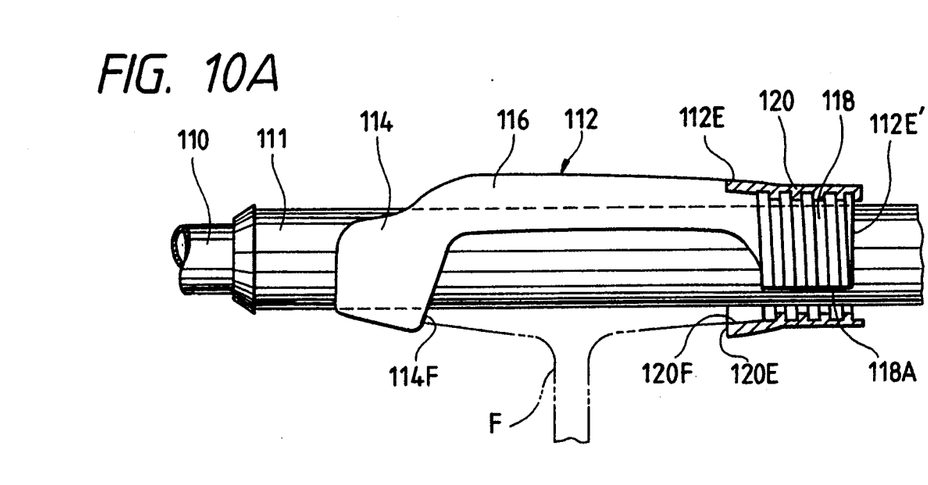
FIGS. 10A and 10B are alternate side views of an embodiment of a reel leg fixing device according to a second aspect of the invention, showing a state in which a reel leg is fixed to a handle portion by use of the present reel leg fixing device.

In FIG. 10A, there is shown a rod 110. The rod 110 includes in the rear outer periphery thereof a handle portion 111 which is covered with an elastic member formed of cork or synthetic resin. A main body 112, which is formed of a thin metal plate, a fiber reinforced synthetic resin or the like, and a fastening tubular member 120 are loosely fitted onto the handle portion 111.

The main body 112 includes a tubular portion 114 having a first reel leg receive portion 114F, a support portion 116 disposed on one end side (in FIG. 10A, the right side) of the tubular portion 114 and on the opposite side (in FIG. 10A, the upper side) of the first reel leg receive portion 114F and extended from the tubular portion 114 in the longitudinal direction of the main body 112, and a partially cylinder-shaped, threadedly engaging receive portion 118 disposed in distal portion of the support portion 116 and having a split portion 118A. Here, the support portion 116 is formed in an upwardly bulged shape in the state thereof shown in FIG. 10A, so that it can be gripped by hand easily.

The fastening tubular member 120 includes a second reel leg receive portion 120F and a threaded portion formed on the inner surface of the fastening tubular member 120 which, when it is engaged with the threadedly engaging receive portion 118, cooperates with the threadedly engaging receive portion 118 in pushing and fixing a reel leg F. The threadedly engaging receive portion 118 is arranged such that it is tapered in the longitudinal direction in the natural state thereof, and the inner surface threaded portion of the fastening tubular member 120 is formed in a cylindrical shape. Therefore, if the two members are engaged with each other and the fastening tubular member 120 is moved forwardly, then the fastening force of the threadedly engaging receive portion 118 is gradually increased to thereby deform the respective components including the threadedly engaging receive portion 118 and support portion 116. Also, because the handle portion 111 is formed of an elastic member in the present embodiment, the main body 112 and fastening tubular member 120 are easier to deform excessively.

If the respective members are deformed excessively in this manner, then when removing the reel, it is hard to remove the threaded engagement between the fastening tubular member 120 and threadedly engaging receive portion 118. In addition to this, the threaded portion can be deformed and the main body 112 can be deformed plastically. In order to prevent this, there is formed an engagement portion 112E in the end portion of the support portion 116 of the main body 112. Thanks to this structure, when the fastening tubular member 120 advances in threaded engagement with the threadedly engaging receive portion 118, an end face 120E of the fastening tubular member 120 facing the engagement portion 112E comes in contact with the engagement portion 112E to thereby cause the threaded advancing movement of the member 120 to stop. This can reduce the possibility of the excessive deformation of the respective members and at the same time can set the fastening force of the reel leg F to a proper and reasonable level. That is, but for the engagement portion 112E, the fastening tubular member 120 could be threadedly moved forwardly still further but, in the present embodiment, the threaded forward movement of the fastening tubular member 120 is forced to stop on the way. This will apply similarly to other embodiments of the invention.

Figure 10B:
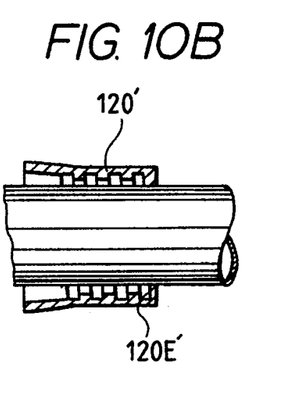

Also, in FIG. 10B, for convenience, there is also shown another fastening tubular member 120' which includes an engagement portion 120E' in the rear end portion of the inner periphery thereof. Here, if the fastening tubular member 120' is used in place of the fastening tubular member 120, then even if the engagement portion 112E is not provided in the main body side member 112, the end face 112E' of the threadedly engaging receive portion 118 of the main body side member 112 is engaged with the inner peripheral engagement portion 120E' of the fastening tubular member 20' to thereby forcibly stop the threadedly advancing movement of the fastening tubular member 120' at a given amount of advancing movement. Also, alternatively, both of the inner peripheral engagement portion 120E' of the fastening tubular member 120' and the engagement portion 112E of the main body side member 112 may be provided.

The invention has been described heretofore by way of the reel leg fixing device of a type that the fixing position of the reel leg is adjustable or movable. However, the invention is not limited to the reel leg fixing device of this type. For example, the invention can also apply to a reel leg fixing device of a type that the fixing position of the reel leg is fixed, as disclosed in the previously described Japanese Utility Model Publication No. 3-76462 of Heisei. In other words, in the latter type of reel leg fixing device, a threaded portion situated at a position fixed to a rod is a part of a main body and a nut member serving as a fastening tubular member for moving a moving hood is threadedly advanced with respect to the threaded portion to thereby fix a reel leg; and, in this case, there may be provided in the main body or in the nut member a stopper which is used to forcibly stop the threaded advancing movement of the nut member at a proper position.

Also, in the above-mentioned embodiments, to achieve the threaded engagement, the threaded portion is formed in both of the main body side member and fastening tubular member. However, the invention is not limited to this. For example, the invention can also apply to an embodiment in which a flexible material such as a rubber material is loaded into the inner peripheral surface of the fastening tubular member and the inner peripheral surface of the fastening tubular member, with the flexible material loaded therein, is then made to bite on the threaded portion of the main body to thereby achieve threaded engagement therebetween.

As can be clearly understood from the foregoing description, according to the second aspect of the invention, there can be supplied a reel leg fixing device which is able to fix a reel leg with a reasonable force and thus to prevent the respective component members thereof from being deformed forcibly.

A reel leg fixing device according to a third aspect of the invention will be described with reference to FIGS. 11 and 14.

Figure 11:
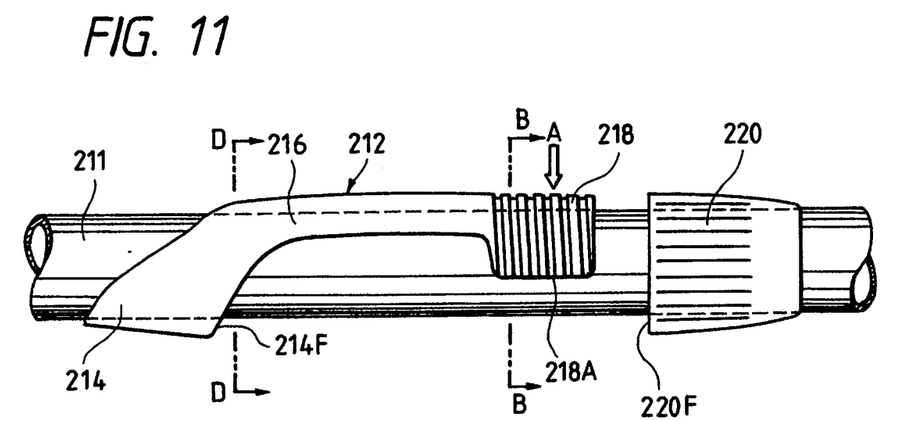
FIG. 11 is a side view of an embodiment of a reel leg fixing device according to a third aspect of the invention, showing a state in which the reel leg fixing device is fitted onto a rod.
Figure 12:
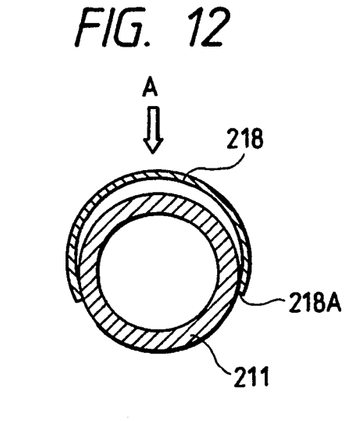
FIG. 12 is a transverse section view taken along the arrow line B—B in FIG. 11.

In FIGS. 11 and 12, there is provided a rod 211, a grip portion of which may be covered with a cork material or the like. The reel leg fixing device includes a main body 212 and a fastening tubular member 220 respectively fitted onto the rod 211.

The main body 212 includes a tubular portion 214 having a first reel leg receive portion 214F, a support portion 216 extended from the tubular portion 214 in the longitudinal direction of the rod 211 on the opposite side to the first reel leg receive portion 214F, and a threadedly engaging receive portion 218 formed in distal portion of the support portion 216, having an end side portion 218A defining a split, and formed in a cylindrical shape in part. The threadedly engaging receive portion 218 includes a threaded portion on the outer periphery thereof which is engageable with a threaded portion formed on the inner periphery of the fastening tubular member 220. A reel leg is inserted into the first reel leg receive portion 214F of the tubular portion 214 and the second reel leg receive portion 220F of the fastening tubular member 220, and thereafter the fastening tubular member 220 is threadedly engaged with the threadedly engaging receive portion 218, so that the reel leg can be fastened and fixed to the rod 211.

The above-mentioned type of reel leg fixing device is advantageous in that the fixing position of the reel leg with respect to the rod 211 can be selected freely and, on the other hand, since the respective component members 212, 220 are normally designed such that they are loosely fitted with the rod 211, in a state in which the reel leg is not fixed, the members 212, 220 are moved unnecessarily in the longitudinal direction of the rod. For this reason, even if trying to fix the reel leg, the main body 212 cannot be provisionally fixed at a desired position, which makes it difficult to fix the reel leg.

In view of this, according to the invention, the respective members 12, 20 or only the main body 12 is formed of an elastic member or material so that the diameter thereof can be enlarged, and further the extending direction of the support portion 16 is set in such a manner that the upper portion thereof can have a clearance and that the end side portion 218A of the threadedly engaging portion 218 can hold the rod 211 therebetween when the main body 212 is fitted onto the rod 211.

Thanks to this, when fitted onto the rod 211, the main body 212 can be retained to the rod 211 at an arbitrary position. Further, since only the end side portion 218A of the threadedly engaging portion 218, which is a part of the main body 212, is retained to the rod 211, it is easy to slide the main body 212. When the main body 212 is formed of an elastic member in this manner, then the main body 212 can be located at a desired position in the rod 211 and the reel leg can be provisionally held while it is inserted into the first reel leg receive portion 214F. Therefore, even if the fastening tubular member 220 is not formed of an elastic member and is located at a distance position, no inconveniences will be produced from the viewpoint of the reel leg fixing operation. For this reason, unlike the main body 212, the fastening tubular member 20 may not be formed of an elastic member.

To threadedly fasten the threadedly engaging portion 218 by the fastening tubular member 220, the threadedly engaging portion 218 may be pressed in a direction of an arrow A to eliminate any clearance between the rod 211 and itself and, after then, the threadedly engaging operation of the member 220 may be executed. Also, alternatively, a partial projection may be provided on the inner periphery of the end side portion 218A of the threadedly engaging portion 218 and the engaging member 218 may be retained to the rod 211 by means of the projection.

Also, unlike the above-mentioned embodiment, the main body 212 may be retained to the rod 211 by the tubular portion 214 instead of the threadedly engaging receive portion 218, provided that the section form thereof taken along the arrow line D—D is similar to that shown in FIG. 12. Further, as shown in FIG. 14 which will be discussed later, the tubular portion 214 may have an elongated or ellipsoidal section with respect to the circular section of the rod 211 and the shorter diameter of the ellipsoidal section of the tubular portion 214 may be originally designed smaller than the outside diameter of the rod 211, whereby, when the tubular portion 214 is fitted onto the rod 211, the diameter of the tubular portion ellipsoidal section can be enlarged in the shorter diameter direction so that the tubular portion 214 can be retained to the rod 211 by means of the resultant elastic force thereof.

Figure 13:
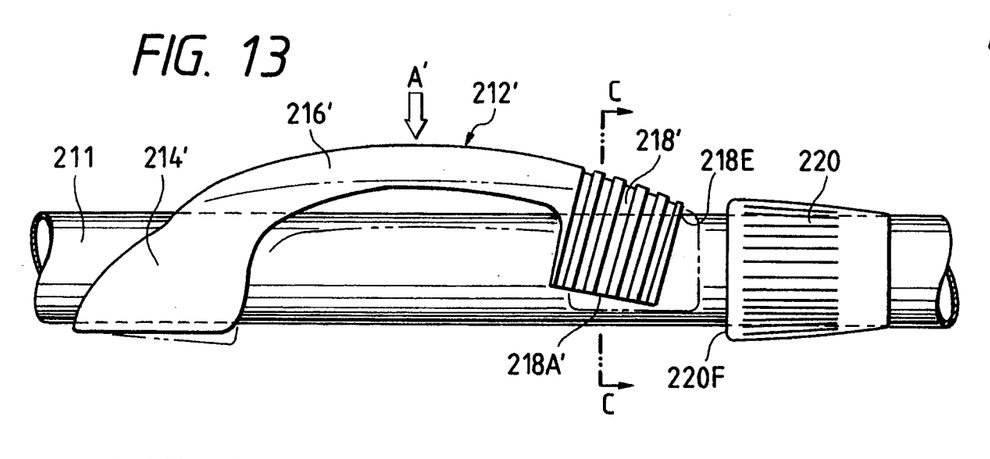
FIG. 13 is a side view of another embodiment of a reel leg fixing device according to the third aspect of the invention, showing a state in which the reel leg fixing device is fitted onto a rod.

Now, in FIG. 13, there is shown another embodiment of a reel leg fixing device according to the second aspect of the invention. In this embodiment, a main body 212' is formed of an elastic member similarly to the above-described embodiment and includes a tubular portion 214' having a first reel leg receive portion 214F, a relatively longer support portion 216', and a threadedly engaging receive portion 218' disposed in a distal portion of the support portion 216' and having a side end portion 218A' defining a split. A fastening tubular member 220 is formed similarly to the above-described embodiment and thus has a second reel leg receive portion 220F.

The support portion 216' is curved like a prawn, as shown in FIG. 12, whereby the leading end angular portion 218E of the threadedly engaging receive portion 218' pushes against the surface of the rod 211 while the inner surface of the first reel leg receive portion 214F of the tubular portion 214' pushes against the surface of the rod 211. For this reason, when the main body 212' is fitted onto the rod 211, a certain degree of friction is produced between the rod 211 and the main body 212', which prevents the main body 212' from moving freely with respect to the rod 211 to thereby retain the main body 212' at a desired position. However, since the friction between these two members is a partial one, the movement of the main body 212' is possible.

Here, in order to reinforce the securing force of the main body 212', the transverse section form thereof taken along the arrow line C—C may be formed similarly to that shown in FIG. 12. When the threadedly engaging receive portion 218' is fastened by the fastening tubular member 20, the support portion 216' must be pushed down in a direction of an arrow A' into a state shown by a two-dot chained line in FIG. 13 before the portion 218' is fastened.

Figure 14:
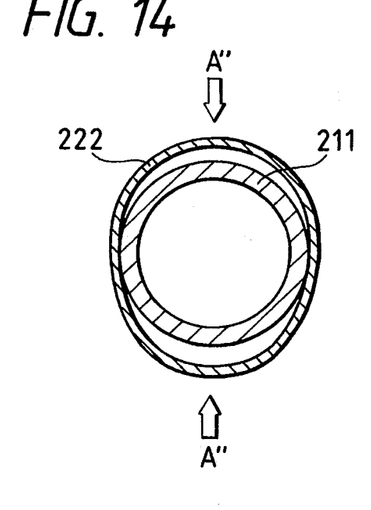
FIG. 14 is a transverse section view of a further embodiment of a reel leg fixing device according to the third aspect of the invention, showing a state in which the reel leg fixing device is fitted onto a rod.

In a reel leg fixing device of the type in which a pair of ring members are fitted onto a rod and the ring members are pushed into the reel leg to thereby fix the reel leg to the rod as disclosed in the previously described Japanese Utility Model Publication No. 4-19173 of Heisei, if each of the two ring members (222) is formed of an elastic member in an ellipsoidal shape having a diameter shorter than the outside diameter of the rod (211) and is then fitted onto the rod (211) in such a manner that the diameter of the ellipsoidal shape is expanded in the shorter diameter direction thereof to be able to hold the rod therebetween as shown in FIG. 14, then the ring members (222) can be held at a desired position in the rod (211). In this state, the movements of the ring members (222) are possible and, if they are pushed in a direction of an arrow A", then the contact thereof with the rod (211) is released, which makes it easier to move the ring members (222) with respect to the rod (211).

In the first and second embodiments in the third aspect of the invention, when it is desired to retain the fastening tubular member 220 as well to the rod 211, the fastening tubular member 220 may be formed of an elastic member in an ellipsoidal shape having a form similar to that shown in FIG. 14. When the fastening tubular member 220 is threadedly engaged with the threadedly engaging receive portion 218 (218') of the main body 212 (212'), the ellipsoidal fastening tubular member 220 may be pushed in the direction of the arrow A" shown in FIG. 14 to a circular shape before the threadedly engaging operation is executed.

In the reel leg fixing device of such a type as shown in FIG. 11 (or in FIG. 13), if the main body is not formed in a shape which permits a fisherman to grip the rod directly as shown in the first embodiment, the threadedly engaging portion 218 may be allowed to hold the rod 211 therebetween with the help of the fastening tubular member 220, when the fastening tubular member 220 is threadedly engaged with the threadedly engaging portion 218 to some degree while the reel leg is not mounted.

As can be clearly understood from the foregoing description, according to the third aspect of the invention, the annular member is formed of an elastic member such that the diameter thereof can be enlarged to or more than the outside diameter of the rod. When the reel leg fixing device is fitted onto the rod, the diameter of the annular member is expanded to thereby allow the annular member and thus the reel leg fixing device to slide freely. If the reel leg fixing device is left alone on the rod, the fixing device is retained on the rod by means of the elastic force or contraction of the annular member. In other words, according to the invention, there can be provided a reel leg fixing device which is able to set the fixing position of the reel leg freely as well as which is able to hold the annular member at an arbitrary position even when the reel leg is not fixed.

Figure 15:
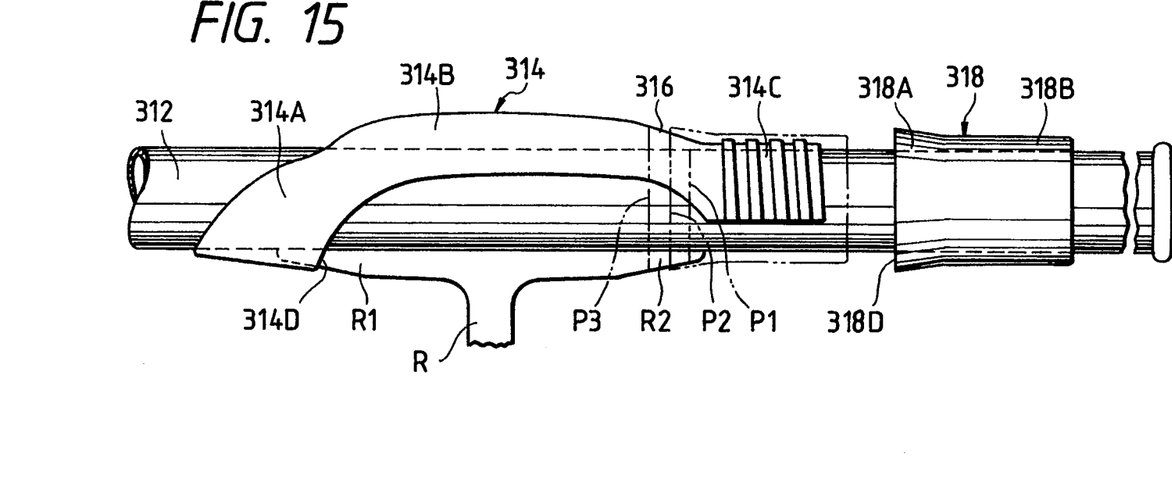
FIG. 15 is a side view of an embodiment of a reel leg fixing device according to a fourth aspect of the invention, showing a state in which it is fitted onto a rod.

FIG. 15 is a side view of an embodiment of a reel leg fixing device according to a fourth aspect of the invention, showing a state in which the device is fittingly mounted onto a rod. In FIG. 15, a tubular main body 314 and a fastening tubular member 318 are both loosely fitted onto a grip 312 of a rod in such a manner that they are free to move with respect to the grip 312. Therefore, a reel leg R can be fastened at a desired position of the rod or grip 312.

The tubular main body 314 includes a tubular portion 314A serving as a hood having a first reel leg receive portion 314D, a support portion 314B extended from the tubular portion 314A in the longitudinal direction of the rod 312, and a threadedly receiving portion 314C formed in a distal portion of the support portion 314B and is in part formed in a tubular shape. The support portion 314B, as shown in FIG. 15, is bulged out upwardly of the rod 312 and includes a steeply inclined portion 316 in the boundary portion between the threadedly receiving portion 314C and itself. To fasten a reel leg R, as shown in FIG. 15, a first leg portion R1 is inserted into a first reel leg receive portion 314D formed in the tubular portion 314A, while a second leg portion R2 is positioned on a portion of the rod 312 corresponding to the steeply inclined portion 316 in the longitudinal direction of the rod 12.

According to the present embodiment, a fastening tubular member 318, which serves as a moving hood into which the second leg portion R2 is inserted for fastening the reel leg R to the rod 312, includes a hood portion 318A having a second reel leg receive portion 318D for receiving the second leg portion R2 and a threadedly engaging portion 318B having a threaded portion in the inner periphery thereof, which portions 318A and 318B are formed integrally with each other. The threadedly engaging portion 318B is brought into threaded engagement with the threadedly engaging receive portion 314C of the tubular main body 314 to thereby move and advance the hood portion 318A. The threadedly engaging portion 318B in cooperation with the receive portion 314C functions to fasten the second leg portion R2 of the reel leg R and, simultaneously to pull the tubular main body 314 to further fasten the first leg portion R1 of the reel leg R by means of the first reel leg receive portion 314D.

The advancing movement of the fastening tubular member 318 for fastening the reel leg R is caused to stop at a position shown by a two-dot chained line P2 due to the existence of the steeply inclined portion 316 of the tubular main body 314. In a convention structure in which the steeply inclined portion 316 is not provided and thus the hood portion 318A of the fastening tubular member 318 is not in contact with the support portion 314B, the inner periphery of the hood portion 318A of the fastening tubular member 318 begins to touch the second leg portion R2 of the reel leg R at a position shown by two-dot chained line P1. Because there exists slight play between the threadedly engaging receive portion 314C of the tubular main body 314 and the threadedly engaging portion 318B of the fastening tubular member 318, the fastening tubular member 318 is able to threadedly advance to the neighborhood of a position shown by a two-dot chained line P3 while it is slightly inclined with respect to the rod 312 (and tubular main body 314), but the advancing movement of the fastening tubular member 318 is stopped in the neighborhood of the position P3.

The steeply inclined portion 316 terminates the advancing movement of the fastening tubular member 318 in the above-mentioned inclined state in the early stage, which can facilitate the operation of fastening the reel leg R to the rod 312. That is, reel mounting operation can be executed easily and quickly.

According to the above-mentioned embodiment, in the fastening tubular member 318, the hood portion 318A is formed integrally with the threadedly engaging portion 318B. However, the present invention is not limited to this but, alternatively, there can be employed a fastening tubular member of a type that the hood portion 318A and threadedly engaging portion 318B are engaged with each other in a mutually rotatable manner (a type disclosed in the previously-described Japanese Utility Model Publication No. 3-76462 and the like, in which, if the threadedly engaging portion is rotated, then the hood portion is not rotated but is moved longitudinally).

Also, the invention is not limited to a type in which the fixing position of the reel leg can be freely selected with respect to the rod as in the above-mentioned embodiment, but the invention can apply also to a reel leg fixing device of a type in which one of the hoods is fixed, as a type disclosed in the above-mentioned Japanese Utility Model Publication No. 3-76462.

Further, in the above-mentioned embodiment, the steeply inclined portion 316 is provided in the tubular main body 314 but, however, in the case of a type that one of the hoods is fixed, the steeply inclined portion may be provided in the rod 312.

Moreover, the first reel leg receive portion 314D of the tubular main body 314 shown in FIG. 15 may also be formed by the hood of another fastening tubular member similarly to the second reel leg receive portion 18D, and thus the invention may be applied to both of the two hoods.

In addition, if the fastening tubular member is formed of resin or the like and the transverse section thereof is designed as deformable, a quick fastening operation can be executed similarly.

As can be clearly understood from the foregoing description, according to the fourth aspect of the invention, the steeply inclined portion is formed on the rod or the like near the reel leg mounting portion. If the moving hood is moved forwardly while fastening the reel leg, the moving hood can be engaged or brought into abutment with the steeply inclined portion at a stage where it advances a short distance, which allows the reel leg to be fastened quickly and sufficiently.

A reel leg fixing device according to a fifth aspect of the invention will be described with reference to FIGS. 16 to 20.

Figure 16:
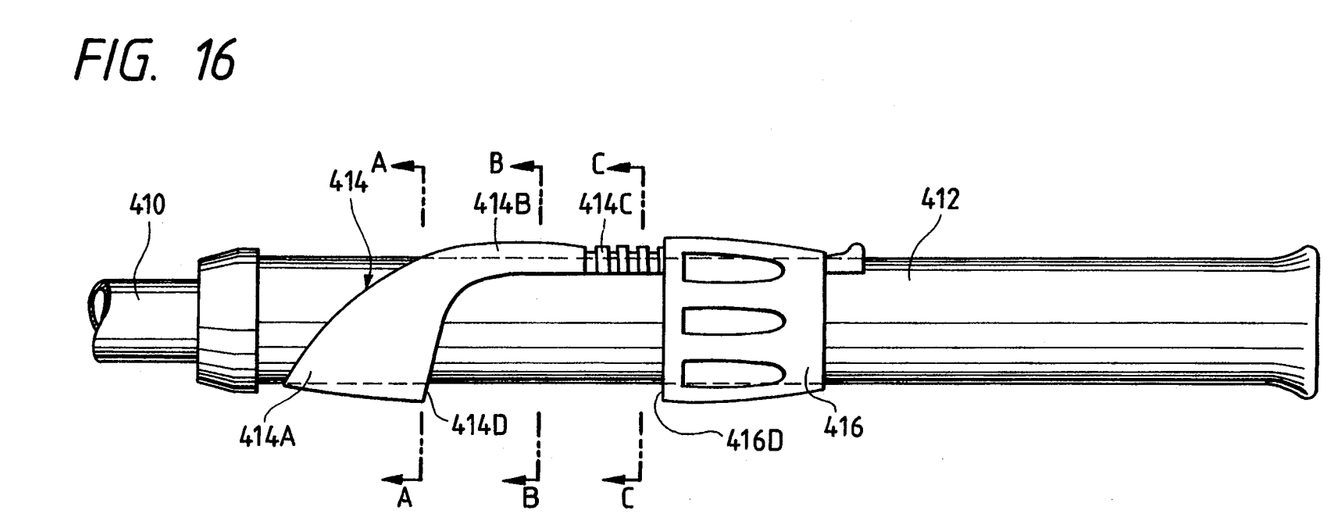
FIG. 16 is a side view of an embodiment of a reel leg fixing device according to a fifth aspect of the invention, showing a state in which it is fitted with a fishing rod.
Figure 17:
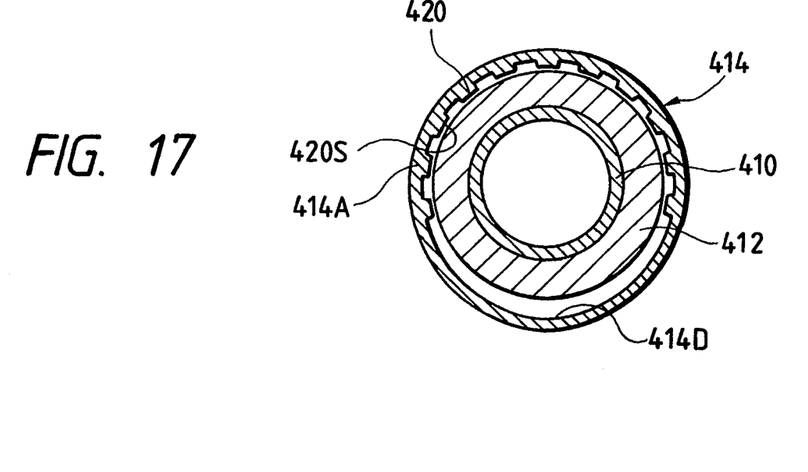
FIG. 17 is a transverse section view taken along the arrow line A—A shown in FIG. 16.

FIG. 16 is a side view of an embodiment of the reel leg fixing device, showing a state in which it is fitted over and mounted to a fishing rod. FIG. 17 is a transverse section view taken along the arrow line A—A shown in FIG. 16. A rod 410, which is formed of a fiber reinforced prepreg, includes in the grip area thereof an elastic grip 412 formed of natural cork, hard sponge or the like.

An annular member 414 is loosely fitted onto the grip 412 in such a manner that it is free to move in the longitudinal direction of the grip 412. The annular member 414 includes a tubular portion 414A which is a complete annulus, a support portion 414B extending from the tubular portion 414A in the longitudinal direction thereof, and a threadedly engaging receive portion 414C provided at a distal portion of the support portion 414B. A fastening tubular member 416 is provisionally threadedly engaged with the threadedly engaging receive portion 414C.

The annular member 414 includes a first reel leg receive portion 414D in one side portion (in FIG. 16, in the lower side portion) of the tubular portion 414A, while the fastening tubular member 416 includes a second reel leg receive portion 416D. That is, in this structure, at first, a reel leg is inserted into the two reel leg receive portions 414D and 416D and then the fastening tubular member 416 is moved forwardly while the fastening tubular member 416 is in threaded engagement with the threadedly engaging receive portion 414C, so that the reel leg can be fastened and fixed to the fishing rod, that is, to the grip 412.

As mentioned above, the reel leg can be fastened and fixed to the grip 412 by advancing the fastening tubular member 416 in threaded engagement and, at the same time, in this operation, due to the existence of the reel leg that is inserted into the first reel leg receive portion 414D, the tubular portion 414A is pushed against the grip 412. However, while an angler is holding the annular member 414 by the hand during fishing, the annular member 414 may be rotated together with the fastening tubular member 416 with respect to the grip 412 during the fishing operation.

To prevent this rotation, according to the invention, as shown in FIG. 17, on the inner periphery of the tubular portion 414A of the annular member 414 there are provided slightly projected and recessed stripes or portions 420 which extend along the longitudinal direction of the tubular portion 414A, that is, along the longitudinal direction of the fishing rod. In FIG. 17, the projected and recessed stripes 420 are shown in an enlarged manner for the purpose of easy understanding. The term "slightly projected and recessed stripes of portions" used here means projected and recessed stripes of a size which, even when the annular member 414 is often moved with respect to the grip 412 by the angler's hand with a slight twisting operation, allows the annular member 414 to move smoothly without hitching.

As described above, the reel leg is fastened and fixed by advancing the fastening tubular member 416 in engagement with the received portion 414C and at the same time the tubular portion 414A is pushed against the grip 412 due to the existence of the reel leg inserted into the first reel leg received portion 414D. The existence of the projected and recessed stripes 420 provides resistance to the rotational movement of the tubular portion 412 with respect to the grip 412, which prevents the annular member 414 from rotating during the angling operation.

Especially, since the grip 412 serving as the fishing rod according to the present embodiment has elasticity, when the reel leg is mounted and the annular member 414 is pushed and held against the grip 412 due to the action of the fastening tubular member 416, then the projected stripes of the slightly projected and recessed stripes 420 bite into the surface of the grip 412 to thereby prevent the rotational movement of the annular member 414 more effectively. Therefore, if the grip 412 is formed of a material having no elasticity, then a rubber member may be attached to the surface 420S of the projected stripe of the slightly projected and recessed stripes 420 so that a great rotation preventive effect can be obtained similarly.

The slightly projected and recessed stripes 420 are not limited to a rectangular shape as shown in FIG. 17, but they may be of a triangular shape, a semi-circular shape or other similar shapes. Further, the projected and recessed stripes 420 of the annular member 414 may be formed on the entire periphery thereof or, as shown in FIG. 17, they may be formed on the part of the whole periphery. Moreover, the projected and recessed stripes 420 may not be formed in the tubular portion 414A but may be formed in such a portion as shown by an arrow line B—B or C—C in FIG. 16, that is, on the inner periphery of the support portion 414B or the threadedly engaging receive portion 414C.

Also, even when the grip 412 has elasticity as in the present embodiment, the attachment of the rubber material to the surface 420S of the projected stripe will give a greater rotation preventive effect. Further, if the inner surface of the annular member 414 is formed in a knurled surface, that is, in a slightly meshed projected and recessed surface, then the rotation preventive effect can be obtained similarly. In addition, a similar rotation preventive effect can be provided when micro-particles are coated and fixed onto the inner surface of the annular member 414 to thereby provide a slightly projected and recessed surface.

Provision of the various kinds of slightly projected and recessed portions as described above not only offers a rotation preventive effect when the annular member is fastened but also offers an effect that, when the loosely fitted annular member 414 is moved with respect to the fishing rod, even if it is twisted to some extent, the annular member 414 can be moved smoothly without hitching on the surface of the rod 412 because the projections and recesses are slight.

In the above-mentioned embodiment, description has been given of a reel leg fixing device of a type that, if a reel leg is inserted into and fixed to an annular member, then the annular member is also pushed against a fishing rod. However, the present invention can also apply even to other type of reel leg fixing device, for example, a reel leg fixing device of a double cylinder type disclosed in Japanese Patent Publication No. 53-86385 of Showa previously introduced in the description of the prior art in this specification. That is, apart from the fact that the reel leg is fixed to the second pipe-shaped member, while the first pipe-shaped member serving as an annular member on the inner peripheral side together with the second pipe-shaped member is fastened to the fishing rod by means of the nut member, the above-mentioned slight projections and recesses can be formed on the inner periphery of the first pipe-shaped member or on the surface of the fishing rod in order to prevent the first pipe-shaped member from rotating with respect to the rod during the fishing operation.

Figure 18:
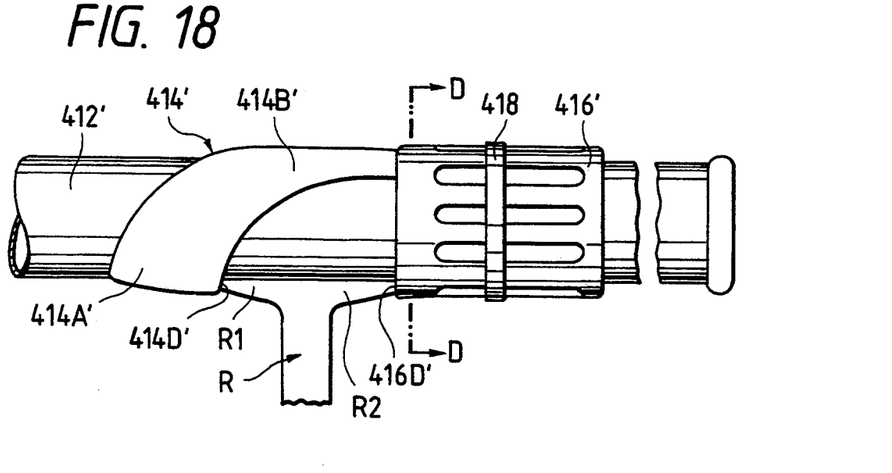
FIG. 18 is a side view of another embodiment of a reel leg fixing device according to the fifth aspect of the invention, showing a state in which a reel leg is fastened.

Referring now to FIG. 18, there is shown another embodiment of a reel leg fixing device according to the fifth aspect of the invention. In this embodiment, on the outer periphery of a rod 410' (FIG. 19) there is formed a grip 412' which is designed to be of a proper size as a gripping portion. A tubular main body 14' having a shape similar to the annular member 14 shown in FIG. 16 and a fastening tubular member 416' as an annular member to be threadedly engaged with the tubular main body 414' are loosely fitted onto the grip 412' and are free to move in the longitudinal direction of the grip 412'.

The tubular main body 414' includes a tabular portion 414A', a support portion 414B' and a threadedly engaging receive portion (not shown). The tubular portion 414A' includes a first reel leg receive portion 414D' which is used to receive a first leg portion R1 of a reel leg R.

On the other hand, the fastening tubular member 416' is formed of a resin material and has a transverse section which is deformable. Originally, between the fastening tubular member 416' and the grip 412' there exists a clearance suitable for the movement thereof. The fastening tubular member 416' can receive a second leg portion R2 of the reel leg R and to fasten it to the grip 412' and also includes a second reel leg receive portion 16D' the shape of which is not constant because it is deformable. Also, the fastening tubular member 416' includes on the inner periphery thereof a threaded portion extending a proper length, which threaded portion is engageable with the above-mentioned threadedly engaging receive portion.

Figure 19:
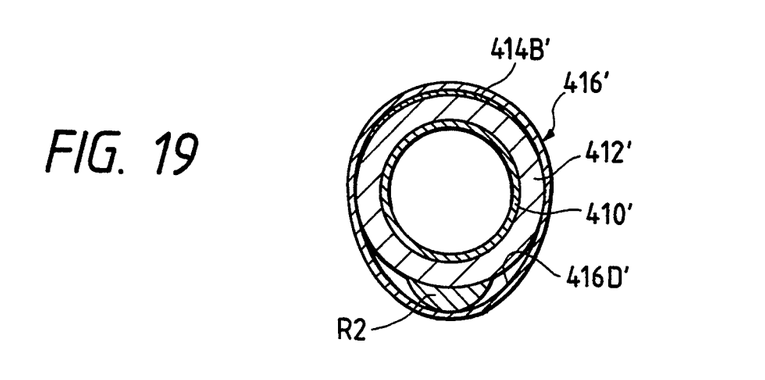
FIG. 19 is a transverse section view taken along the arrow line D—D shown in FIG. 18; and, FIG. 20 is a transverse section view of a modification of a fastening tubular member shown in FIG. 18.

Here, referring to FIG. 19 which is a transverse section view taken along the arrow line D—D in FIG. 18, if the second leg portion R2 of the reel leg R is inserted between the grip 412' and fastening tubular member 416', then the fastening tabular member 416', because it is elastically deformable, is deformed along the grip 412', the support portion 414B' of the tubular main body 414' an the second leg portion R2 into an egg shape or an ellipsoidal shape. In this state, the fastening tubular member 416' fastens the reel leg R tightly. To prevent the fastening tubular member 416' from being broken because the transverse section shape thereof is deformed in this manner, a shown in FIG. 19, it is preferable that the fastening tubular member 416' is reinforced by a band 419 formed of metal.

Therefore, during the fishing operation, even if the hand holding the grip 12' happens to apply such a force as to rotate the fastening tubular member 416' which is a part of the reel leg fixing device, the rotation of the fastening tubular member 416' is prevented because the fastening tubular member 416' has already been deformed into a shape different from a true circle and also because the fastening tubular member 416' is in close contact with the grip 412'.

Figure 20:
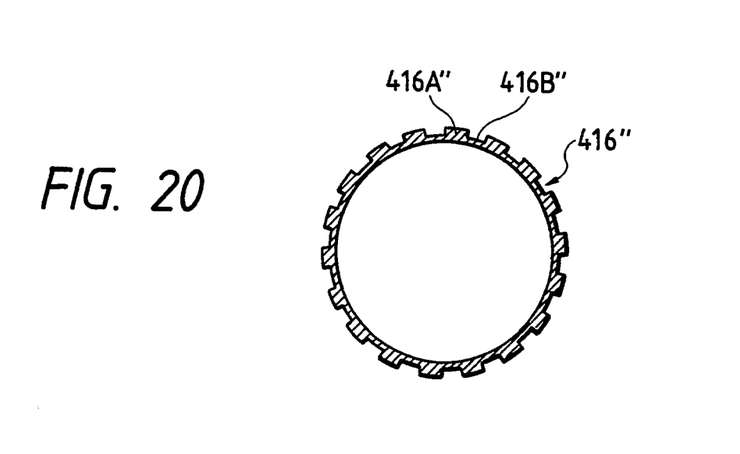

In FIG. 20, there is shown a transverse section view (a position corresponding to the arrow line D—D in FIG. 18) of a metal fastening tubular member 416'' in place of the above-mentioned fastening tubular member 416' formed of a resin. The fastening tubular member 416'' has a section which is composed of alternately arranged thick portions 416A'' and thin portions 416B''. Even a relatively solid material such as metal can be deformed like resin, if such section form is selected. Therefore, such section form may be arranged only in the neighborhood of the end portion (in FIG. 18, the left end portion) of the reel leg receive portion side of the fastening tubular member 416'' that is deformed. That is, if it has substantially the same length as the fastening tubular member 416' shown in FIG. 18, then the fastening tubular member 416'' may have such section form over about half of the whole length thereof. Of course, the whole fastening tubular member 416'' may have such section form.

As can be understood clearly from the foregoing description, according to the fifth aspect of the invention, the slight projections and recesses are formed on the inner periphery of the annular member. When the annular member is moved with respect to the fishing rod, the annular member can be moved smoothly and also the annular member can be prevented from rotating with respect to the fishing rod during use of the fishing rod.

Also, according to the fifth aspect of the invention, because the annular member can be deformed along the fishing rod and reel leg in to a different shape and also because it is in close contact with the fishing rod and the like, the annular member can be prevented against rotation.

What is claimed is:
1. A reel leg fixing device for mounting and fixing a reel leg along a longitudinal axis of a fishing rod, comprising:

a first member, loosely fitted onto said rod, having a first axial end and a second axial end, and including:

a tubular main body located at said first axial end and provided with a first reel leg receive portion;

an engaging receive portion, located at said second axial end, only partially circumscribing and loosely fitted onto said rod; and, a support portion extending along said longitudinal axis between said tubular main body and said engaging receive portion of said rod; and a second member including:

a fastening tubular member loosely fitted on said rod, said fastening tubular member being provided with a second reel leg receive portion and threadably engaged with said engaging receive portion, said fastening tubular member fastening said reel leg and said engaging receive portion onto said rod.

2. A reel leg fixing device as set forth in claim 1, wherein threaded grooves are formed in the outer periphery of skid engaging receive portion and in the inner periphery of said fastening tubular member, respectively, whereby said engaging receive portion and said fastening tubular member are threadedly engaged with each other.

3. A reel leg fixing device a set forth in claim 1, wherein a threaded groove is formed in the outer periphery of said engaging receive portion and a flexible member adapted to deformably engage said threaded groove is fixed to the inner periphery of said fastening tubular member, whereby said engaging receive portion and fastening tubular member are threadedly engaged with each other.

4. A reel leg fixing device as set forth in claim 1, wherein said tubular main body is formed with a substantially U-shaped, axially extending notched portion through which a thumb of a fisherman's hand grasping said rod together with said reel leg fixing device is capable of directly contacting with said rod.

5. A reel leg fixing device as set forth in claim 1, wherein said support portion extends in said axial direction and only partially circumscribes said rod such that a side portion of said rod between said tubular main body and said engaging receiving portion is exposed.

6. A reel leg fixing device as set forth in claim 1, further comprising:

a stopper formed on at least one of said support portion and said fastening tubular member for preventing an excessive engagement between said engaging receiving portion and said fastening tubular member.

7. A reel leg fixing devices as set forth in claim 1, wherein at least one of said tubular main body and said engaging receive portion is formed of such an elastic member as to retain said first member onto said rod in place when said reel leg fixing device is not used to fix said reel leg to said rod.

8. A reel leg fixing device as set forth in claim 1, wherein said fastening tubular member is formed of such an elastic member as to retain said second member onto said rod in place when said reel leg fixing device is not used to fix said reel leg to said rod.

9. A reel leg fixing device as set forth in claim 1, further comprising:

an inclined portion connecting said engaging receive portion with said support portion and abuttable against the inner periphery of said fastening tubular member for reducing skew of said fastening tubular member relative to said axis when said tubular fastening member is engaged with said engaging receive portion and said reel leg.

10. A reel leg fixing device as set forth in claim 1, further comprising:

slightly projected and recessed portions formed on at least one of said tubular main body, said support portion and said engaging receive portion, said slightly projected and recessed portions being contacting with said rod for preventing a mutual rotation between said first member and said rod when said fastening tubular member is engaged with said engaging receive portion.

11. A reel leg fixing device as set forth in claim 1, wherein said fastening tubular member is elastically deformable into a substantially ellipsoidal cross-sectional shape when said fastening tubular member is engaged with said engaging receive portion.

* * * * *